(12) United States Patent
Vite Cadena

(10) Patent No.: US 11,535,141 B2
(45) Date of Patent: Dec. 27, 2022

(54) UNIVERSAL CUP HOLDER ADAPTER FOR VEHICLES INCLUDING TEMPERATURE CONTROL FEATURE

(71) Applicant: Nissan North America, Inc., Franklin, TN (US)

(72) Inventor: Manuel Alejandro Vite Cadena, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 98 days.

(21) Appl. No.: 16/941,065

(22) Filed: Jul. 29, 2020

(65) Prior Publication Data

US 2022/0032831 A1 Feb. 3, 2022

(51) Int. Cl.
*A47K 1/08* (2006.01)
*B60N 3/10* (2006.01)

(52) U.S. Cl.
CPC ............ *B60N 3/107* (2013.01); *B60N 3/104* (2013.01)

(58) Field of Classification Search
CPC ......... B60N 3/104; B60N 3/107; F16M 11/22
See application file for complete search history.

(56) References Cited

U.S. PATENT DOCUMENTS

| 7,566,984 | B2 | 7/2009 | Blanchard |
| 9,783,104 | B2 | 10/2017 | Koizumi et al. |
| 2016/0236605 | A1* | 8/2016 | Doi .................. F25D 31/007 |
| 2017/0282773 | A1* | 10/2017 | Ji ........................... B60N 3/101 |
| 2021/0094455 | A1* | 4/2021 | Vite Cadena .......... B60N 3/104 |
| 2021/0316648 | A1* | 10/2021 | Kim ......................... H02J 7/02 |
| 2022/0001785 | A1* | 1/2022 | Prabhakar .......... B60H 1/00271 |

FOREIGN PATENT DOCUMENTS

| KR | 20100130513 A | 12/2010 |
| KR | 20150005317 A | 1/2015 |
| KR | 101873857 B1 | 7/2018 |
| KR | 102057301 B1 | 12/2019 |

OTHER PUBLICATIONS

U.S. Appl. No. 16/588,099, filed Sep. 30, 2019.

* cited by examiner

*Primary Examiner* — Amy J. Sterling
(74) *Attorney, Agent, or Firm* — Young Basile Hanlon & MacFarlane, P.C.

(57) ABSTRACT

A universal adapter is disclosed for a cup holder included in the console of a vehicle. The universal adapter includes: a bezel; at least one receptacle extending from the bezel; and an electronic temperature control unit supported by the bezel. The bezel is configured in correspondence with a recess defined by the console such that movement of the universal adapter is inhibited via contact between an outer wall of the bezel and an inner wall of the console defining the recess. The at least one receptacle is receivable by the cup holder and is configured to receive a beverage container. The electronic temperature control unit is in electrical communication with the at least one receptacle such that energy is communicated to the at least one receptacle upon activation of the electronic temperature control unit to thereby vary a temperature of the universal adapter.

20 Claims, 5 Drawing Sheets

UNIVERSAL CUP HOLDER ADAPTER FOR VEHICLES INCLUDING TEMPERATURE CONTROL FEATURE

TECHNICAL FIELD

The present disclosure relates to cup holders for vehicles and, more specifically, to a universal cup holder adapter that includes a temperature control feature.

BACKGROUND

Many vehicles include one or more cup holders in a variety of locations (e.g., in the vehicle's center console, the dashboard, the vehicle doors, etc.). Known cup holders, however, vary in shape and size across vehicle platforms and are typically devoid of any temperature control functionality. As such, a need exists for a universal cup holder adapter with wide range compatibility that can introduce a temperature control feature to an existing vehicle cup holder.

SUMMARY

In one aspect of the present disclosure, a universal adapter is disclosed for a cup holder included in the console of a vehicle. The universal adapter includes: a bezel; at least one receptacle that extends from the bezel; and an electronic temperature control unit that is supported by the bezel. The bezel is configured in correspondence with a recess defined by the (vehicle) console such that movement of the universal adapter is inhibited via contact between an outer wall of the bezel and an inner wall of the console defining the recess. The at least one receptacle is configured for insertion into the cup holder and to receive a beverage container. The electronic temperature control unit is in electrical communication with the at least one receptacle such that energy is communicated to the at least one receptacle upon activation of the electronic temperature control unit to thereby vary a temperature of the universal adapter.

In certain embodiments, the bezel and the at least one receptacle may be configured as discrete structures.

In certain embodiments, the at least one receptacle may be mechanically connected to the bezel.

In certain embodiments, the at least one receptacle may include a first receptacle and a second receptacle that is spaced from the first receptacle along a longitudinal axis of the bezel.

In certain embodiments, the electronic temperature control unit may extend from the bezel into a gap defined between the first receptacle and the second receptacle.

In certain embodiments, the bezel may define a vertical height that varies along the longitudinal axis thereof.

In certain embodiments, the bezel may define a vertical height that is generally uniform along the longitudinal axis thereof.

In certain embodiments, the bezel may include a first bezel portion extending in generally orthogonal relation to a vertical axis defined by the at least one receptacle and a second bezel portion extending about the at least one receptacle such that the second bezel portion is configured for positioning between the at least one receptacle and the cup holder.

In certain embodiments, the first bezel portion and the second bezel portion may be configured as discrete structures.

In certain embodiments, the first bezel portion may be mechanically connected to the second bezel portion.

In certain embodiments, the first bezel portion and the second bezel portion may be integrally formed.

In another aspect of the present disclosure, a vehicle is disclosed that includes a console and a universal adapter that is configured for removable reception by the console. The console includes a cup holder and defines a recess that extends about a periphery of the cup holder. The universal adapter provides a temperature control feature to effectuate temperature variation in the universal adapter and includes: a bezel; at least one receptacle that extends from the bezel into the cup holder; and an electronic temperature control unit that is supported by the bezel. The bezel is receivable by the recess in the console and includes a configuration that substantially approximates that of the recess such that movement of the universal adapter is inhibited by an inner wall of the console defining the recess. The electronic temperature control unit is configured to communicate (transfer) energy to the at least one receptacle to thereby effectuate the temperature variation in the universal adapter.

In certain embodiments, the at least one receptacle may include a mouth that is positioned adjacent to the bezel and a base.

In certain embodiments, the at least one receptacle may include a tapered configuration such that the mouth defines a first transverse cross-sectional dimension and the base defines a second transverse cross-sectional dimension that is less than the first transverse cross-sectional dimension.

In certain embodiments, the bezel and the at least one receptacle may be configured as discrete structures.

In certain embodiments, the at least one receptacle may be mechanically connected to the bezel.

In certain embodiments, the at least one receptacle may include a first receptacle and a second receptacle that is spaced from the first receptacle along a longitudinal axis of the bezel.

In certain embodiments, the electronic temperature control unit may extend from the bezel such that the electronic temperature control unit is positioned between the first receptacle and the second receptacle.

In certain embodiments, the bezel may define a vertical height that varies along the longitudinal axis thereof.

In certain embodiments, the bezel may include a first bezel portion that extends in generally orthogonal relation to a vertical axis defined by the at least one receptacle and a second bezel portion that extends about the at least one receptacle such that the second bezel portion is configured for positioning between the at least one receptacle and the cup holder.

In certain embodiments, the first bezel portion and the second bezel portion may be configured as discrete structures.

In certain embodiments, the first bezel portion may be mechanically connected to the second bezel portion.

In certain embodiments, the first bezel portion and the second bezel portion may be integrally formed.

In another aspect of the preset disclosure, a method is disclosed for effectuating temperature variation in a beverage retained within a console in a vehicle. The method includes installing a universal adapter in the console by positioning a bezel of the universal adapter within a recess defined by the console such that a receptacle extending from the bezel is received by a cup holder within the console and activating an electronic temperature control unit supported by the bezel to thereby effectuate the temperature variation.

In certain embodiments, installing the universal adapter may include positioning a first bezel portion within the recess and positioning a second bezel portion within the cup holder such that the second bezel portion is positioned between the cup holder and the receptacle.

In certain embodiments, installing the universal adapter may include positioning the universal adapter such that the electronic temperature control unit extends into a gap defined between a first cup holder receiving a first receptacle extending from the bezel and a second cup holder receiving a second receptacle extending from the bezel.

BRIEF DESCRIPTION OF THE DRAWINGS

According to common practice, the various features of the drawings may not be to scale, and may be arbitrarily expanded or reduced for clarity.

DETAILED DESCRIPTION

Figure 1:
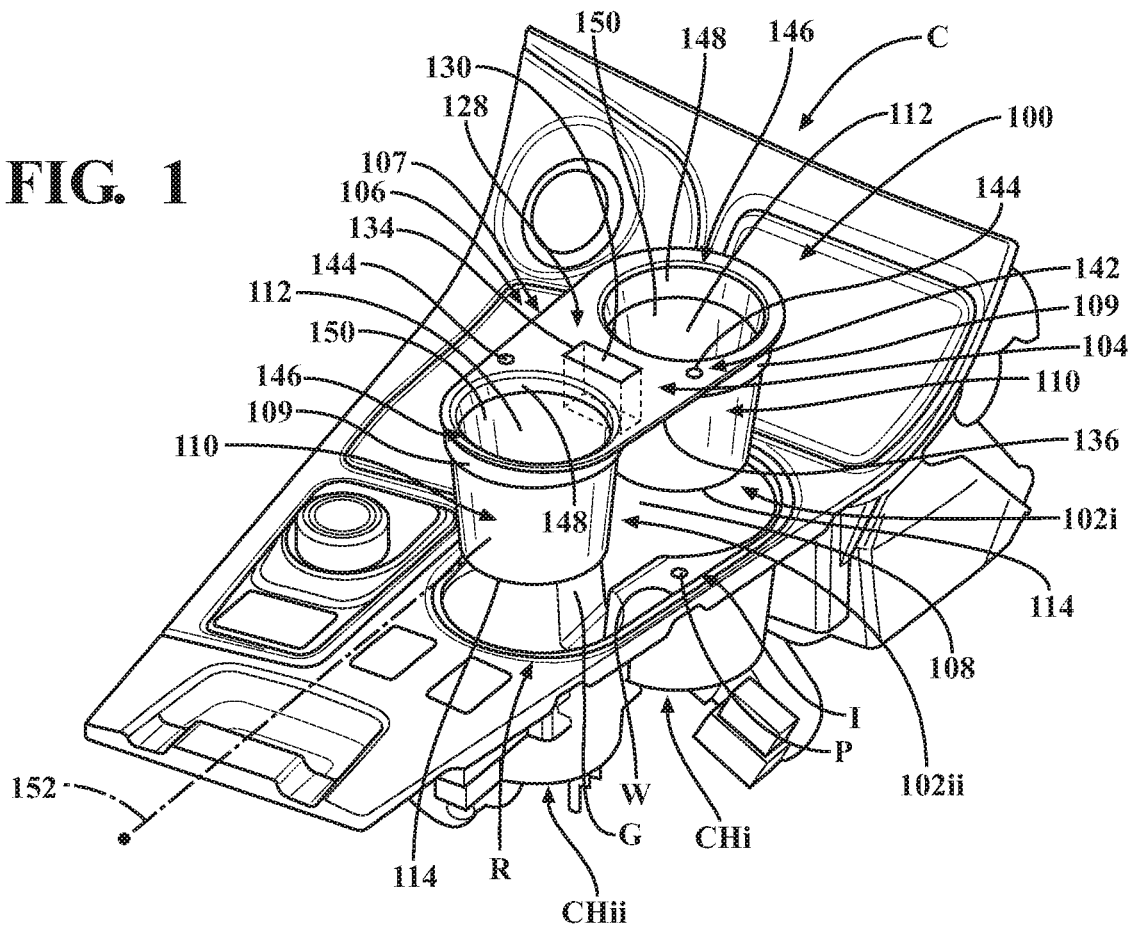
FIG. 1 is a top, perspective view of a vehicle console including a cup holder shown with one embodiment of universal adapter for the cup holder according to the principles of the present disclosure.
Figure 2:
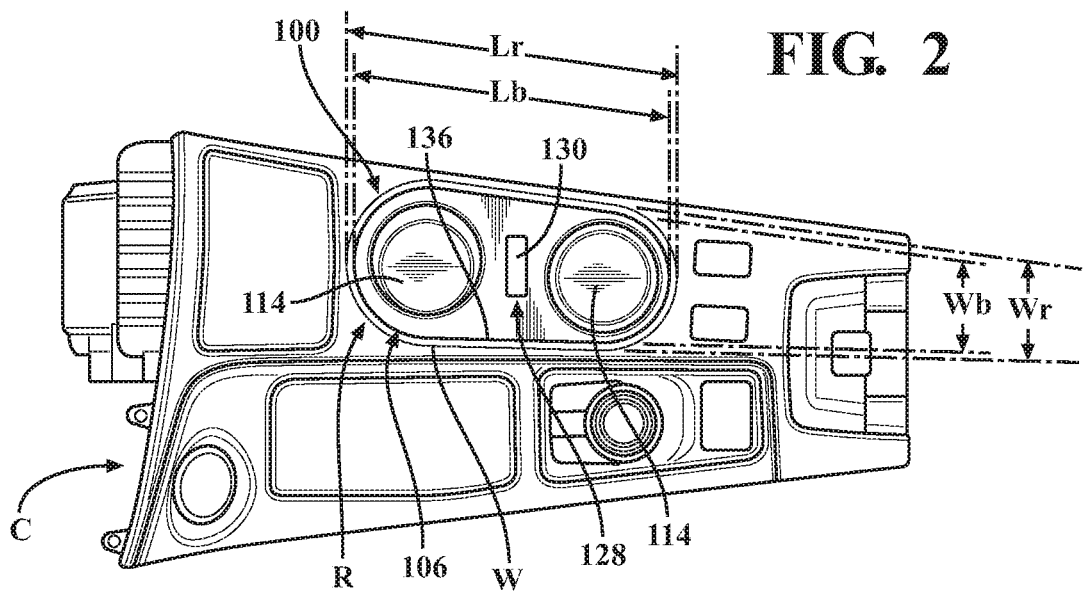
FIG. 2 is a top, plan view illustrating the universal adapter seen in FIG. 1 installed (positioned) within the cup holder.

The present disclosure describes various embodiments (implementations) of a universal adapter for vehicle cup holders. The adapter described herein includes a bezel that is configured in correspondence with the particular cup holder in the vehicle (e.g., the bezel includes a configuration that substantially approximates (mirrors) that of the cup holder) to not only enhance fit and finish, but restrict movement of the adapter relative to the cup holder. By varying the configuration of the bezel, the adapter can be customized for use with a wide variety of vehicles, thus making the adapter (generally) universal. The adapter also includes one or more receptacles and an electronic temperature control unit (TCU), each of which is supported by the bezel. Each receptacle receives a beverage (container) and is configured for insertion into the cup holder, and the TCU is in electrical communication with the receptacle(s) such that energy is communicated (transferred) to the receptacle(s) upon activation of the TCU, which allows for temperature variation (control) of the adapter (e.g., heating and/or cooling) and, thus, the beverage (container(s)) accommodated by the receptacle(s).

Although discussed herein below in the context of a cup holder that is formed in (defined by) the center console in a vehicle, it should be appreciated that the presently disclosed adapter may be configured for use with cup holders located in a variety of locations. For example, it is envisioned that the adapter may be configured for use with cup holders that are formed in (defined by) the vehicle's dashboard or doors, the rear passenger console, the armrest, etc.

With reference to FIGS. 1-5, a vehicle's center console C is illustrated and shown with one embodiment of the presently disclosed adapter, which is identified by the reference character 100. As discussed in detail below, the adapter 100 includes one or more receptacles 102 that are configured to receive (or otherwise accommodate) a beverage container (e.g., a bottle, a cup, an insulated container, etc.), an electronic TCU 104 that is in electrical communication with the receptacle(s) 102, and a bezel (housing) 106.

The adapter 100 (e.g., the receptacles 102, the bezel 106, etc.) may include any suitable material or combination of materials and may be formed through any suitable method of manufacture (e.g., injection molding, 3-D printing, stamping, laser machining, etc.). In the particular embodiment of the disclosure illustrated throughout the figures, for example, the receptacle(s) 102 include one or more electrically conductive materials (e.g., one or more metallic materials, such as copper, aluminum, stainless steel, etc.), which allows for the communication (transfer) of (electrical) energy from the TCU 104 to the receptacle(s) 102 upon activation of the adapter 100, as described in further detail below, and the bezel 106 includes (e.g., is formed partially or entirely from) one or more plastics or polymers. To enhance the fit and finish of the adapter 100, in certain embodiments, it is envisioned that the material used in construction of the bezel 106 may correspond to (e.g., substantially match) that used in construction of the console C.

In the particular embodiment seen in FIGS. 1-5, the adapter 100 includes a pair of (e.g., first and second) receptacles 102i, 102ii, which correspond to, and are configured for reception by (insertion into) the pair of cup holders CHi, CHii included in the console C. More specifically, the receptacle 102i is spaced from the receptacle 102ii along a longitudinal axis Y (FIG. 4) defined by a body portion 107 of the bezel 106 so as to define a vertical gap 108 (FIG. 1) there between that corresponds to a vertical gap G defined between the cup holders CHi, CHii. It should be appreciated, however, that the particular configuration of the adapter 100 may be varied to facilitate use with a variety of consoles C in alternate embodiments of the disclosure. For example, it is envisioned that the adapter 100 may include a single receptacle 102 or a multitude of receptacles 102 (e.g., 3, 4, or more) dependent upon the particular configuration of the console C and/or that the relative positioning of the receptacle(s) 102 may be varied to alter the configuration (e.g., dimensions) of the gap 108.

Depending upon the particular configuration of the console C, it is envisioned that the receptacles 102 may be either identical or non-identical in configuration. For example, it is envisioned that the receptacles 102i, 102ii may include (generally) equivalent axial (vertical) cross-sectional dimensions (heights) Hi, Hii (FIG. 4) and transverse cross-sectional dimensions Di, Dii (e.g., diameters) or that the respective axial and/or transverse cross-sectional dimensions Hii, Dii of the receptacle 102ii may deviate substantially from the respective axial and/or transverse cross-sectional dimensions Hi, Di of the receptacle 102i. In the particular embodiment of the disclosure seen in FIGS. 1-5, for example, while the transverse cross-sectional dimensions Di, Dii are (generally) equivalent, the height Hi of the receptacle 102i is less than the height Hii of the receptacle 102ii.

The receptacle(s) 102 extend from the bezel 106 such that the receptacle(s) 102 are insertable into the cup holders CH. It is envisioned that the receptacle(s) 102 may be connected to (engageable with) the bezel 106 in either a fixed or removable manner, and that the receptacle(s) 102 may be either integrally (e.g., monolithically) formed with the bezel 106 or that the receptacle(s) 102 and the bezel 106 may be formed as separate, discrete structures. In the particular embodiment of the adapter 100 seen in FIGS. 1-5, for example, the bezel 106 defines (or otherwise includes) retention collar(s) 109 (FIGS. 1, 4) that extend vertically (downward) from the body portion 107 of the bezel 106 and receive (engage) the receptacle(s) 102. Depending upon the particular configuration of the receptacle(s) 102, it is envisioned that that the retention collar(s) 109 may be either identical or non-identical in configuration. For example, in the illustrated embodiment, the retention collar 109ii defines an axial dimension (e.g., height) that is greater than the corresponding axial dimension (height) of the retention collar 109i.

Whereas the retention collar(s) 109 are formed integrally with the body portion 107 in the illustrated embodiment, the receptacle(s) 102 are formed separately and are mechanically connected thereto. The mechanical connection between the retention collar(s) 109 and the receptacle(s) 102 allows the receptacle(s) 102 to be separated from the retention collar(s) 109, which promotes interchangeability and use of the bezel 106 with a variety of receptacle(s) 102, thereby increasing the versatility and universality of the adapter 100 by facilitating use of the adapter 100 with a variety of vehicles in which the configuration of the cup holders CH may vary. For example, in various embodiments of the disclosure, it is envisioned that the retention collar(s) 109 and the receptacle(s) 102 may include corresponding detents and recesses that are configured for snap-fit engagement, that the retention collar(s) 109 and the receptacle(s) 102 may be configured for engagement in an interference fit, that the retention collar(s) 109 and the receptacle(s) 102 may be connected via the use of one or more mechanical fasteners (e.g., screws, pins, rivets, retention clips etc.), or in any other suitable manner.

Each receptacle 102 includes a sidewall 110 defining a mouth (upper opening) 112 (FIG. 1) positioned adjacent to the bezel 106 and a base (bottom wall) 114 that extends radially inward from the sidewall 110 so as to support a beverage container (or other such article) upon insertion through the mouth 112. In the particular embodiment illustrated in FIGS. 1-5, the sidewall and the base 114 each defining a thickness T (FIG. 4) that lies substantially within the range of approximately 3 mm to approximately 5 mm. It should be appreciated, however, that the thickness T may vary between the sidewall 110 and the base 114 in alternate embodiments and/or that the thickness(es) T may deviate from the disclosed range without departing from the scope of the present disclosure.

In certain embodiments, is envisioned that the sidewall 110 of each receptacle 102 may include one or more engagement portions 116 (e.g., indentation(s), opening(s), contour(s), surface irregularity(ies), etc.) (FIG. 3) that are configured for engagement with (reception of) one or more corresponding retention arms A that extend into the cup holders CH to enhance securement of the adapter 100 to the console C. For example, it is envisioned that the retention arm(s) A may be (spring) biased towards the position seen in FIG. 3 such that, upon insertion of the adapter 100, the retention arm(s) A engage (contact) the engagement portion(s) 116 to stabilize the adapter 100 relative to the console C and inhibit (if not entirely prevent) unintended relative movement there between (e.g., rattling). It is also envisioned, however, that the engagement portion(s) 116 may be eliminated when the adapter 100 is intended for use with a console C that is devoid of the retention arm(s) A. In an additional embodiment, it is envisioned that the adapter 100 may be secured relative to the console C via one or more clips (or other such mechanical connectors) (not shown) that may extend vertically downward from the bezel 106 for engagement (contact) with the retention arm(s) A.

In the particular embodiment of the disclosure illustrated in FIGS. 1-5, the receptacles 102 are tapered in configuration such that each mouth 112 defines a transverse cross-sectional dimension (e.g., a diameter) that lies substantially within the range of approximately 60 mm to approximately 80 mm and each base 114 defines a transverse cross-sectional dimension (e.g., a diameter) that lies substantially within the range of approximately 50 mm to approximately 70 mm. It should be appreciated, however, that dimensions outside this range would not be beyond the scope of the present disclosure depending, for example, upon the particular configuration of the console C. Additionally, the present disclosure also envisions embodiments in which one or more of the receptacles 102 includes a non-tapered configuration such that that the transverse cross-sectional dimension defined by the mouth 112 substantially approximates the transverse cross-sectional dimension defined by the base 114.

As indicated above, the receptacle(s) 102 are in electrical communication with the TCU 104, which facilitates the transmission of energy from the TCU 104 to the receptacle(s) 102 to effectuate a temperature change. While the TCU 104 and the receptacle(s) 102 are discussed herein below in the context of heating the adapter 100, it should be appreciated that the configuration of the adapter 100 (e.g., the TCU 104 and the receptacle(s) 102) may be altered to facilitate cooling instead, such as, for example, via the Peltier effect.

In the particular embodiment of the adapter 100 shown throughout the figures, the sidewall 110 of each receptacle 102 includes respective inner (interior) and outer (exterior) layers 118i, 118o (FIG. 5) that are arranged concentrically so as to define an intermediate space 120 there between. It is envisioned that the layers 118i, 118o may be discrete components that are mechanically connected (e.g., via snap-fitting) or that the layers 118i, 118o may be integrally (e.g., monolithically) formed. It is also envisioned that the layers 118i, 118o may include (e.g., may be formed partially or entirely from) the same materials or dissimilar materials. For example, in one particular embodiment, it is envisioned that the layer 118i may include (e.g., may be formed partially or entirely from) one or more thermally-conductive materials, such as, for example, aluminum, copper, brass, etc., and that the layer 118o may include (e.g., may be formed partially or entirely from) one or more non-thermally conductive materials (or materials with reduced thermal conductivity compared to those utilized in the layer 118$i$), such as, for example, ceramic(s), plastic(s), polymer(s), fiberglass, etc.

Each receptacle 102 includes one or more conductive members 122 (e.g., wires, coils, plates or other such segments of conductive material, etc.) (FIG. 5) that are in electrical communication with the TCU 104 (e.g., via one or more wires Wi or the like) such that, upon activation of the adapter 100, electrical energy is communicated (transferred) to the conductive member(s) 122 to thereby effectuate a temperature change in the receptacle(s) 102 in the manner described herein. More specifically, the conductive member(s) 122 are embedded within the sidewall 110 of each receptacle 102 such that they are positioned within the intermediate space 120 that is defined between the layers 118$i$, 118$o$.

To facilitate energy transmission to the adapter 100, in certain embodiments, such as that seen in FIGS. 1-5, it is envisioned that the TCU 104 may be electrically connected to a power source PS (FIG. 4) in the vehicle. For example, it is envisioned that the TCU 104 may be electrically connected to a wiring harness WH, which may provide power to a variety of accessories in the vehicle (e.g., foot well lights, interior lights, a cigarette lighter, one or more USB ports, etc.) and may reside in (or may be otherwise secured to or associated with) the console C. In such embodiments, it is envisioned that the adapter 100 (e.g., the TCU 104) may be connected to the power source PS in any suitable manner. For example, it is envisioned that the TCU 104 may be directly connected to the power source PS via one or more wires Wii extending through an opening in the console C (e.g., such that the adapter 100 is hard-wired to the vehicle) or that the TCU 104 may be indirectly connected to the power source PS (e.g., via a USB connection, an electrical plug, etc.). Additionally, or alternatively, it is envisioned that the adapter 100 (e.g., the TCU 104) may include a dedicated (standalone) power source 124 (e.g., a battery) (FIG. 5) to provide the requisite energy for effectuating temperature variation in the adapter 100 in the manner described herein, which would allow for removability of the adapter 100 and interchangeability of the adapter 100 between vehicles. It is thus envisioned that the adapter 100 may either be a permanent (or semi-permanent) or removable component of the vehicle.

Figure 4:
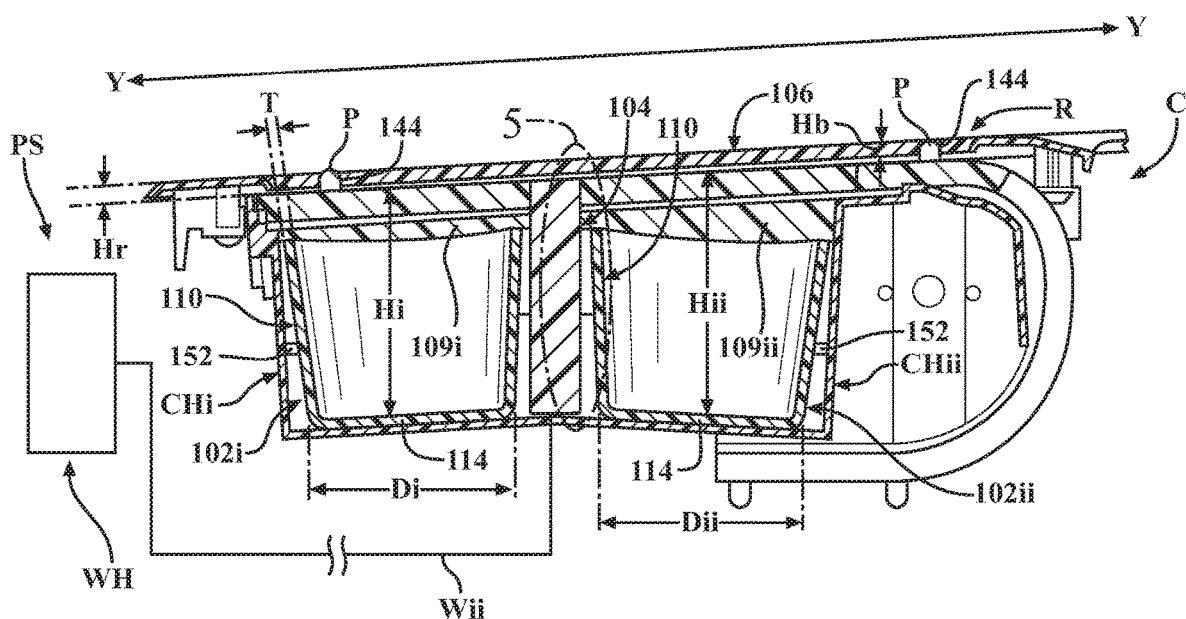
FIG. 4 is a partial, (vertical) cross-sectional view illustrating the universal adapter seen in FIG. 1 shown installed (positioned) within the cup holder.
Figure 5:
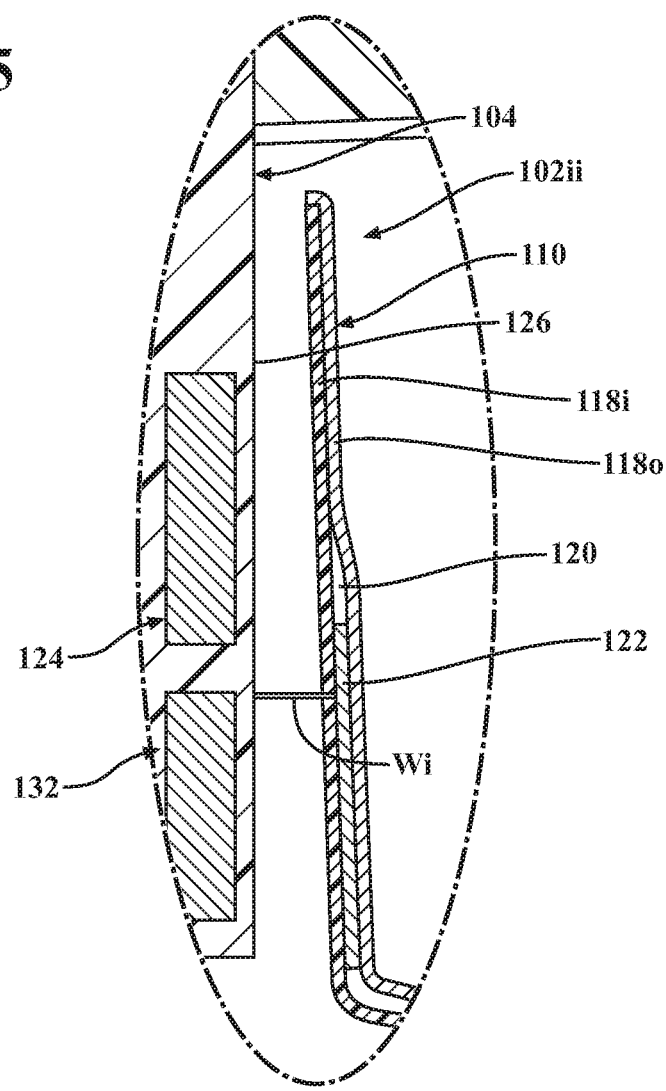
FIG. 5 is an enlargement of the area of detail identified in FIG. 4.

As seen in FIGS. 1 and 4, for example, the TCU 104 is supported by the bezel 106 and extends vertically (downwardly) therefrom. More specifically, in the illustrated embodiment, the TCU 104 includes an external housing 126 (FIG. 5) that is integrally connected to the bezel 106 such that the TCU 104 extends therefrom into the vertical gap 108 (FIG. 1) defined between the receptacles 102$i$, 102$ii$. In alternate embodiments of the adapter 100, however, it is envisioned that the TCU 104 may be configured for removable connection to the bezel 106, such as, for example, via one or more mechanical connectors (e.g., screws, clips, etc.). Additionally, depending upon the particular configuration of the console C and the cup holder(s) CH, for example, it is envisioned that the TCU 104 may be located outwardly (e.g., radially outward, forwardly, rearwardly) of the receptacle 102$i$ or the receptacle 102$ii$.

The TCU 104 may include any components suitable for the intended purpose of regulating temperature variation in the adapter 100. For example, it is envisioned that the TCU 104 may include a control member 128 (FIGS. 1, 2) (e.g., a button 130, a switch, an LCD screen, etc.), one or more printed circuit boards (PCBs), one or more temperature sensors, one or more visual indicator(s) (e.g., colored lights or LEDs), and any electrical wiring or connections necessary to support functionality of the TCU 104 and the various components thereof (e.g., the control member 128, the temperature sensor(s), the visual indicator(s), etc.). In certain embodiments, it is also envisioned that the TCU 104 may include a control system 132 (e.g., a microprocessor) that is configured to operate and/or regulate the TCU 104. For example, it is envisioned that the control system 132 may include a logic circuit that cooperates with the temperatures sensor(s) to regulate energy communication to the receptacle(s) 102 to maintain a certain temperature, to deactivate the TCU 104 upon reaching a threshold temperature (e.g., to inhibit (if not entirely prevent) overheating), etc.

In the particular embodiment shown throughout the figures, for example, the TCU 104 is configured such that the control member 128 extends through an aperture 134 (FIG. 1) in the bezel 106. Positioning the control member 128 in the manner illustrated not only improves user access thereto, but facilitates the ease with which the adapter 100 is activated, deactivated, and otherwise controlled.

While the configuration of the receptacle(s) 102 and the bezel 106 may vary from embodiment to embodiment (e.g., in accordance with the specification configuration of the console C), as described herein, it is envisioned that the configuration (and components) of the TCU 104 may remain consistent, regardless of the particular vehicle with which the adapter 100 may be associated.

Figure 6:
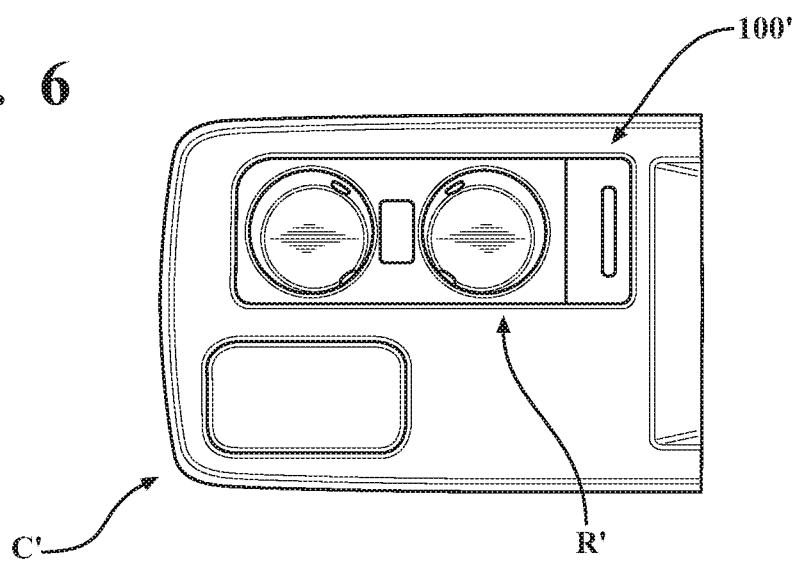
FIG. 6 is a top, plan view illustrating an alternate embodiment of the universal adapter shown installed (positioned) within a cup holder having an alternate configuration.
Figure 7:
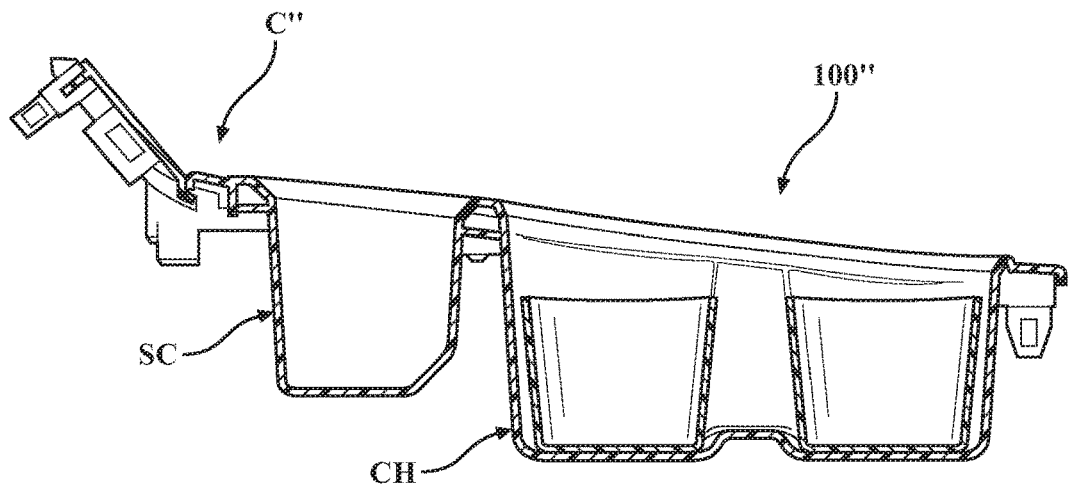
FIG. 7 is a partial, (vertical) cross-sectional view illustrating an alternate embodiment of the universal adapter shown installed (positioned) within a cup holder having an alternate configuration.
Figure 8:
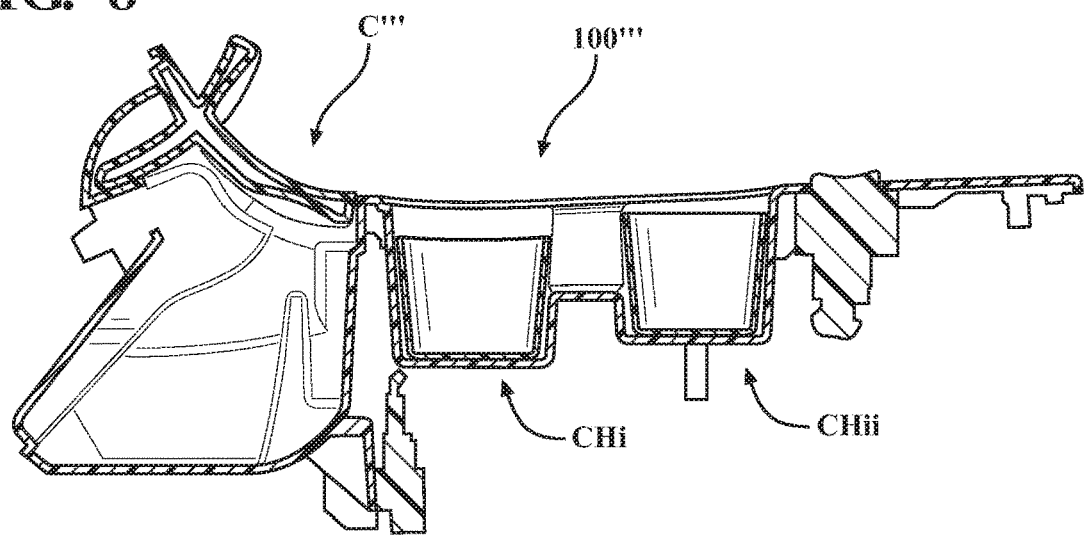
FIG. 8 is a partial, (vertical) cross-sectional view illustrating an alternate embodiment of the universal adapter shown installed (positioned) within a cup holder having an alternate configuration.

With continued reference to FIGS. 1-5, the bezel 106 will be discussed. The bezel 106 supports the receptacle(s) 102 and the TCU 104 and is configured in correspondence with the console C. For example, in the context of the particular vehicle shown, the console C defines a recess R (FIGS. 1, 2, 4) that extends about a periphery of the cup holders CH and the bezel 106 includes a configuration that substantially approximates (mirrors) that defined by the recess R such that the bezel 106 is received by the recess R upon installation of the adapter 100. More specifically, the bezel 106 defines cross-sectional dimensions Lb, Wb, Hb (FIGS. 2, 4) (e.g., an axial length, a lateral width, and a vertical height) which substantially approximate (mirror) the corresponding cross-ssectional dimensions Lr, Wr, Hr (FIGS. 2, 4) (e.g., axial length, lateral width, and vertical height/depth) defined by the recess R, which facilitates engagement (contact) between an outer (peripheral) wall 136 (FIG. 1) of the bezel 106 and an inner wall W defined by the recess R to limit (if not entirely prevent) undesirable movement of the adapter 100 relative to the console C (e.g., rattling). Although the recess R and the bezel 106 are each shown as being (generally) elliptical in configuration in FIGS. 1-5, it should be appreciated that the configuration of the bezel 106 may be varied as necessary or desired to facilitate installation in the manner described herein in accordance with the particular configuration of the console C. For example, FIGS. 6-8 illustrate several variations on the console C and the adapter 100. More specifically, FIG. 6 illustrates an embodiment of the adapter (identified by the reference character 100') that is (generally) rectangular in configuration in accordance with the illustrated console and recess (which are respectively identified by the reference characters C', R'), FIG. 7 illustrates an embodiment of the adapter (identified by the reference character 100") that is configured for use with a console C" that includes a storage compartment SC located forwardly of the cup holders CH, and FIG. 8 illustrates an embodiment of the adapter (identified by the reference character 100''') that is configured for use with a console C''' in which the cup holders CHi, CHii are positioned at different vertical positions (heights).

Figure 9A:
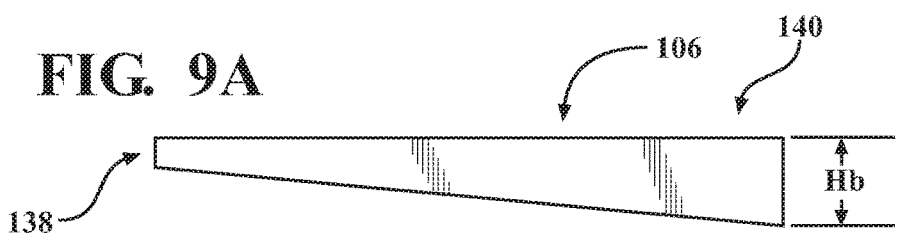
FIG. 9A is a partial, (vertical) cross-sectional view illustrating a bezel of the universal adapter seen in FIG. 1 according to an alternate embodiment of the disclosure.
Figure 9B:
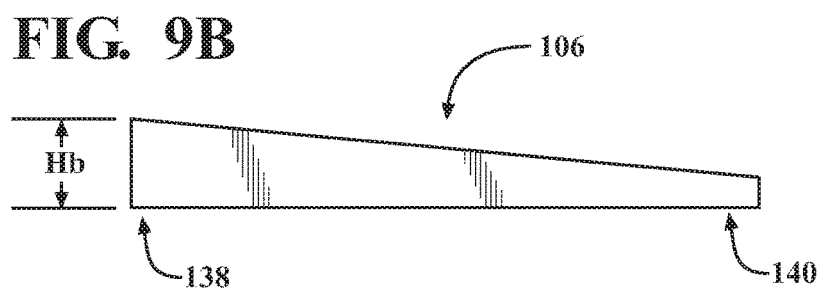
FIG. 9B is a partial, (vertical) cross-sectional view illustrating the bezel of the universal adapter seen in FIG. 1 according to another embodiment of the disclosure.

Depending upon the particular configuration of the console C, it is envisioned that the cross-sectional dimension (height) Hb of the bezel 106 may be either (generally) uniform along the longitudinal axis Y thereof (and the axial cross-sectional dimension (length) Lb), as seen in FIG. 4, or that that the axial cross-sectional dimension Hb of the bezel 106 may be non-uniform (variable) along the longitudinal axis Y thereof (and the axial cross-sectional dimension (length) Lb). For example, it is envisioned that the bezel 106 may include a stepped axial cross-sectional profile, or that the bezel 106 may include a (generally) tapered configuration in which that the axial cross-sectional dimension Hb increases from a forward (first) end 138 of the bezel 106 towards a rear (second) end 140 of the bezel 106, as seen in FIG. 9A, or in which the axial cross-sectional dimension Hb decreases from the forward end 138 towards the rear end 140, as seen in FIG. 9B.

To enhance the fit and finish between the adapter 100 and the console C, in certain embodiments, it is envisioned that the bezel 106 may be configured for receipt by the recess R in an interference fit. Additionally, or alternatively, it is envisioned that the bezel 106 may configured for mechanical engagement (contact) with the console C. For example, as seen in FIG. 1, the bezel 106 and the console C may include corresponding installation features 142, I, respectively, that are configured for mating engagement to facilitate not only securement of the bezel 106 in relation to the console C, but proper alignment of the bezel 106 during installation of the adapter 100. In the particular embodiment of the disclosure seen in FIGS. 1-5, for example, the bezel 106 includes one or more openings 144 (FIGS. 1, 4), apertures, recesses, or the like that are configured to receive one or more corresponding projections P, detents, or other such extensions that extending vertically upward from the console C. Depending upon the particular vehicle and the configuration of the console C, however, it is envisioned that the configurations of the installation features 142, I may be reversed (e.g., it is envisioned that the projection(s) P, detent(s), etc., may be provided on the bezel 106 such that they extend vertically downward therefrom and that the opening(s) 144, aperture(s), recess(es), etc. may be provided on the console C for reception of the projection(s) P, detent(s), etc.).

The bezel 106 includes one or more windows 146 (FIG. 1) that are configured in correspondence with the receptacle(s) 102, which allows one or more beverage containers to pass through the bezel 106 into the receptacle(s) 102. More specifically, the window(s) 146 are positioned in alignment with the receptacle(s) 102 and each defines a transverse cross-sectional dimension (e.g., a diameter) that substantially approximates the transverse cross-sectional dimension D defined by the corresponding receptacle(s) 102 such that an inner wall 148 of each window 146 is (generally) aligned (coplanar) with an inner surface 150 defined by the sidewall 110 of each receptacle 102 adjacent to the mouth 112.

Figure 3:
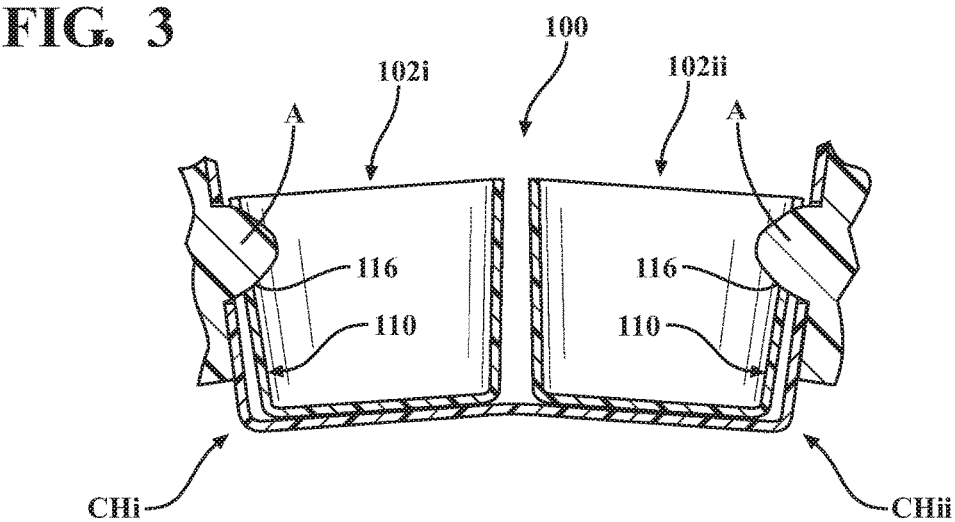
FIG. 3 is a partial, (vertical) cross-sectional view of the universal adapter seen in FIG. 1 shown installed (positioned) within a cup holder having an alternate configuration.

With reference again to FIGS. 1-5, installation and use of the adapter 100 will be discussed. To install the adapter 100, the receptacle(s) 102 are aligned with and positioned within (inserted into) the cup holder(s) CH in the console C and the bezel 106 is aligned with and positioned within (inserted into) the recess R. As the adapter 100 is brought into engagement (contact) with the console C, the installation feature(s) 142 on the bezel 106 engage (contact) the installation feature(s) I on the console C which, as mentioned above, not only secures the bezel 106 in relation to the console C but facilitates proper alignment and installation of the adapter 100. Depending upon the particular configuration of the console C (e.g., the cup holders CH) and the adapter 100, it is envisioned that securement of the adapter 100 to the console C may be further enhanced via engagement (contact) between the receptacle(s) 102 and the retention arms A (FIG. 3). To further enhance securement of the adapter 100 to the console C, in certain embodiments, it is envisioned that any gapping between the cup holder(s) CH and the receptacle(s) 102 may be addressed and accommodated for via the use of one or more bumpers 152 (FIGS. 1, 4) (e.g., a rubberized spacer, washer, etc.), a mechanical connector (e.g., a clip or the like), etc., to further inhibit (if not entirely prevent) unintended relative movement (e.g., rattling) between the adapter 100 and the console C.

To facilitate energy transmission to the adapter 100, the TCU 104 is electrically connected to the power source PS (FIG. 4) in the vehicle (e.g., the wiring harness WH in the console C) such as, for example, via the wires Wii, which can be accessed through the console C and exposed prior to physical connection of the adapter 100 to the console C, via USB connection, or the like. Alternatively, however, depending upon the particular configuration of the vehicle and the adapter 100, it is envisioned that the need for electrical connection of the adapter 100 to the console C may be eliminated via integration of the aforementioned dedicated (standalone) power source 124 (FIG. 5) into the TCU 104, thus simplifying the installation (and removal) process.

Once installed in the console C, the adapter 100 can be activated (e.g., via the control member 128 (FIG. 1)) such that (electrical) energy is communicated (transferred) from the TCU 104 to the conductive member(s) 122 (FIG. 5) in the sidewall 110 of each receptacle 102 so as to effectuate a temperature change in the receptacle(s) 102 and, thus, any beverages(s) accommodated thereby, which is facilitated by the thermally-conductive material(s) used in construction of the layer 118$i$ of the sidewall 110.

Figure 10A:
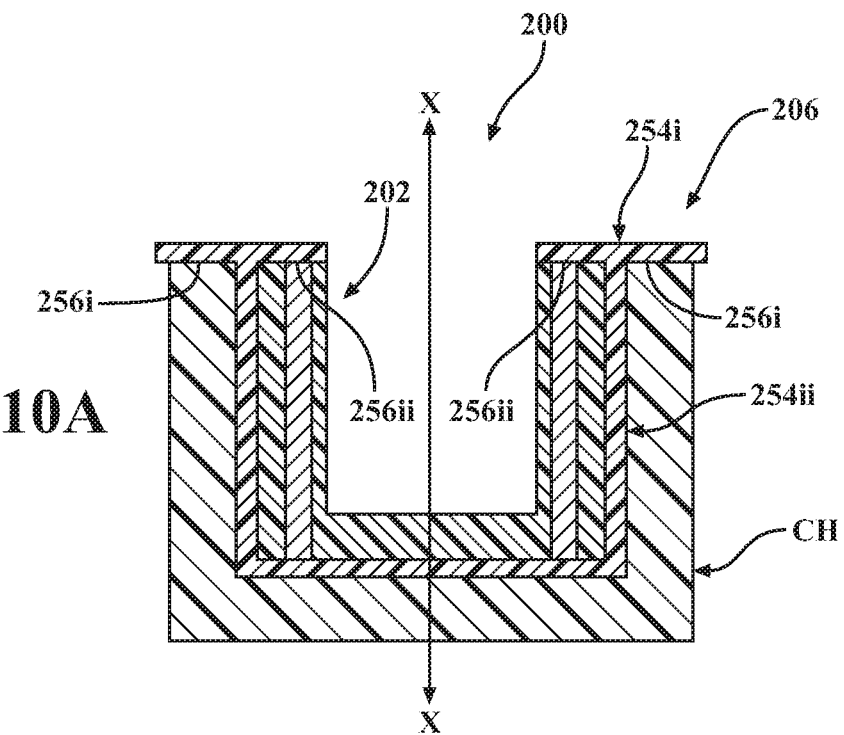
FIG. 10A is a partial, (vertical) cross-sectional view of an alternate embodiment of the universal adapter shown installed (positioned) within a cup holder.

Referring now to FIG. 10A, an alternate embodiment of the adapter will be discussed, which is identified by the reference character 200. The adapter 200 is substantially similar to the adapter 100 discussed above and, thus, will only be described with respect to any differences therefrom in the interest of brevity.

The adapter 200 includes a bezel 206 that supports one or more receptacles 202, as discussed above in connection with the adapter 100. The bezel 206 includes a first (e.g., horizontal, external) bezel portion 254$i$ and a second (e.g., vertical, internal) bezel portion 254$ii$. The bezel portion 254$i$ extends laterally inward and laterally outward relative to (from) the bezel portion 254$ii$ in (generally) orthogonal relation to a vertical axis X defined by the receptacle(s) 102 so as to define flanges 256$i$, 256$ii$. More specifically, the flange 256$i$ extends laterally outward relative to (from) the bezel portion 254$ii$ and is configured for positioning within (reception by) the recess R (FIGS. 1, 2) in the console C so as to limit (if not entirely prevent) undesirable movement of the adapter 200 relative to the console C (e.g., rattling) upon installation of the adapter 200. The flange 256$ii$ extends laterally inward relative to (from) the bezel portion 254$ii$ and defines an overhang that accommodates the receptacle(s) 202 (e.g., to further stabilize the adapter 200 by limiting (if not entirely preventing) undesirable (vertical) relative movement (rattling) between the receptacle(s) 202 and the bezel 206).

The bezel portion 254$ii$ extends vertically downward from the bezel portion 254$i$ and is configured for positioning between the receptacle(s) 202 and the cup holder(s) CH in the console C. More specifically, the bezel portion 254$ii$ includes a (generally) U-shaped cross-sectional configuration that occupies (fills) any gapping between the receptacle(s) 202 and the cup holder(s) CH and allows the receptacle(s) 202 to seat within the bezel portion 254ii such that the bezel portion 254ii extends about (around) the receptacle(s) 202, thereby further inhibiting (if not entirely preventing) unintended relative movement (e.g., rattling) between the adapter 200 and the console C as well as separation (removal) of the receptacle(s) 202 from the bezel 106.

Although the bezel portions 254i, 254ii are shown as being integrally (e.g., monolithically) formed in the embodiment illustrated in FIG. 10A, it should be appreciated that the bezel portions 254i, 254ii may instead be formed as separate, discrete structures that may be connected together in any suitable manner. For example, it is envisioned that the bezel portions 254i, 254ii may be mechanically connected such as, for example, in a snap-fit arrangement, via the inclusion of detent(s) and recess(es), via the use of one or more mechanical fasteners (e.g., screws, pins, rivets, retention clips etc.).

Figure 10B:
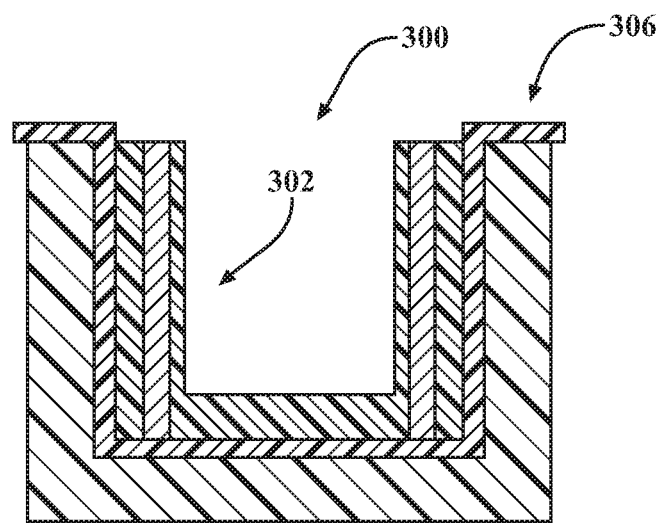
FIG. 10B is a partial, (vertical) cross-sectional view of an alternate embodiment of the universal adapter shown installed (positioned) within a cup holder.

FIG. 10B illustrates another embodiment of the adapter, which is identified by the reference character 300. The adapter 300 includes a bezel 306 that supports one or more receptacles 302 and is identical to the adapter 200, but for inclusion of the flange 256ii (FIG. 10A). Omission of the flange 256ii allows for separation (removal) of the receptacle(s) 302 from the bezel 306 (e.g., to facilitate cleaning, replacement, etc.).

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass variations upwards of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A universal adapter for a cup holder included in a console of a vehicle, the universal adapter comprising:
    a bezel including a body portion configured in correspondence with a recess defined by the console such that movement of the universal adapter is inhibited via contact between an outer wall of the bezel and an inner wall of the console defining the recess;
    first and second receptacles extending from the bezel such that the body portion of the bezel extends radially outward from and circumferentially about the first and second receptacles, the first and second receptacles being configured for insertion into the cup holder and to receive a beverage container; and
    an electronic temperature control unit supported by the bezel and positioned between the first and second receptacles so as not to interfere with installation of the universal adapter, the electronic temperature control unit being in electrical communication with the first and second receptacles such that energy is communicated to the first and second receptacles upon activation of the electronic temperature control unit to thereby vary a temperature of the universal adapter.

2. The universal adapter of claim 1, wherein the bezel and the first and second receptacles are configured as discrete structures, the first and second receptacles being mechanically connected to the bezel.

3. The universal adapter of claim 1, wherein the second receptacle is spaced from the first receptacle along a longitudinal axis of the bezel, the electronic temperature control unit extending from the bezel into a gap defined between the first and second receptacles.

4. The universal adapter of claim 3, wherein the bezel defines a vertical height that varies along the longitudinal axis thereof.

5. The universal adapter of claim 3, wherein the bezel defines a vertical height that is generally uniform along the longitudinal axis thereof.

6. The universal adapter of claim 1, wherein the bezel includes a first bezel portion extending in generally orthogonal relation to vertical axes defined by the first and second receptacles and a second bezel portion extending about the first and second receptacles such that the second bezel portion is configured for positioning between the first and second receptacles and the cup holder.

7. The universal adapter of claim 6, wherein the first bezel portion and the second bezel portion are configured as discrete structures, the first bezel portion being mechanically connected to the second bezel portion.

8. The universal adapter of claim 6, wherein the first bezel portion and the second bezel portion are integrally formed.

9. A vehicle comprising:
a console including a cup holder and defining a recess extending about a periphery of the cup holder; and
a universal adapter configured for removable reception by the console and having a temperature control feature to effectuate temperature variation in the universal adapter, the universal adapter including:
a bezel including a body portion receivable by the recess, the bezel including a configuration substantially approximating that of the recess such that movement of the universal adapter is inhibited by an inner wall of the console defining the recess;
first and second receptacles extending from the bezel into the cup holder such that the body portion of the bezel extends radially outward from and circumferentially about the first and second receptacles; and
an electronic temperature control unit supported by the bezel and positioned between the first and second receptacles so as not to interfere with installation of the universal adapter, the electronic temperature control unit being configured to communicate energy to the first and second receptacles to thereby effectuate the temperature variation in the universal adapter.

10. The vehicle of claim 9, wherein the first and second receptacles each include a mouth positioned adjacent to the bezel and a base, each of the first and second receptacles including a tapered configuration such that the mouth defines a first transverse cross-sectional dimension and the base defines a second transverse cross-sectional dimension less than the first transverse cross-sectional dimension.

11. The vehicle of claim 9, wherein the bezel and the first and second receptacles are configured as discrete structures, the first and second receptacles being mechanically connected to the bezel.

12. The vehicle of claim 9, wherein the second receptacle is spaced from the first receptacle along a longitudinal axis of the bezel.

13. The vehicle of claim 12, wherein the bezel defines a vertical height that varies along the longitudinal axis thereof.

14. The vehicle of claim 9, wherein the bezel includes a first bezel portion extending in generally orthogonal relation to vertical axes defined by the first and second receptacles and a second bezel portion extending about the first and second receptacles such that the second bezel portion is configured for positioning between the first and second receptacles and the cup holder.

15. The vehicle of claim 14, wherein the first bezel portion and the second bezel portion are configured as discrete structures, the first bezel portion being mechanically connected to the second bezel portion.

16. The vehicle of claim 14, wherein the first bezel portion and the second bezel portion are integrally formed.

17. A universal adapter for a cup holder included in a console of a vehicle, the universal adapter comprising:
a bezel configured for removable insertion into the console;
first and second receptacles removably connected to the bezel and extending therefrom so as to facilitate insertion of the first and second receptacles into the cup holder, wherein each of the first and second receptacles includes a conductive member; and
an electronic temperature control unit positioned between the first and second receptacles so as not to interfere with installation of the universal adapter, the electronic temperature control unit being in electrical communication with the conductive members such that the electronic temperature control unit communicates energy to the first and second receptacles upon activation to thereby vary a temperature of the universal adapter.

18. The universal adapter of claim 17, wherein the conductive members are embedded in sidewalls of the first and second receptacles.

19. The universal adapter of claim 17, wherein the first and second receptacles include engagement portions configured for engagement with corresponding structure included on the console and extending into the cup holder to thereby inhibit relative movement between the universal adapter and the console.

20. The universal adapter of claim 17, wherein the bezel includes a body portion extending radially outward from and circumferentially about the first and second receptacles.

* * * * *